UNITED STATES PATENT OFFICE 2,622,107

MANUFACTURE OF ALKYL CHLORIDES

George W. Mattson, Baton Rouge, La., assignor to Ethyl Corporation, New York, N. Y., a corporation of Delaware No Drawing. Application October 28, 1950,
Serial No. 192,810

4 Claims. (Cl. 260—657)

This invention relates to the manufacture of the lower alkyl chlorides by the reaction of an alcohol and hydrogen chloride. More particularly, the invention relates to improvement in such processes in which the reaction is carried out by contacting an alcohol feed and gaseous hydrogen chloride in the presence of a concentrated solution of a metal chloride catalyst and at elevated temperatures.

The alkyl chlorides are important industrial chemicals, especially the lower molecular weight alkyl chlorides, particularly those containing from one to four carbon atoms. These alkyl chlorides find extensive and important usage as chemical intermediates in the manufacture of various end products, and as highly efficient solvents. For example, ethyl chloride is extensively used in the manufacture of tetraethyllead and ethyl cellulose, and methyl chloride is used in the manufacture of various synthetic elastomers.

A favored process for the manufacture of such alkyl chlorides involves contacting the alcohol and the hydrogen chloride at reaction temperatures and in the presence of a concentrated aqueous solution of a metal chloride catalyst. According to the preferred mode of carrying out such processes, a vaporized stream of the alcohol and hydrogen chloride gas is mixed and introduced at the bottom of a pool of a concentrated solution of a metal chloride catalyst. The mixed feed vapors pass upwardly and react in the presence of the catalyst solution, which is maintained at an elevated temperature by virtue of the heat liberated by the reaction. The product gases consist of the vaporized alkyl chloride, water vapor and small amounts of excess hydrogen chloride and unreacted alcohol. These product gases then pass to a cooler wherein the major portion of the water vapor present is condensed plus most of the excess hydrogen chloride. The condensate stream can be distilled for recovery of the alcohol and hydrogen chloride and frequently a portion of this condensate is refluxed to the reaction vessel to maintain the catalyst solution at a constant concentration level. The alkyl chloride vapor stream discharged from the cooler passes to final purification steps before it is compressed and liquefied. The final purification steps consist of scrubbing the alkyl chloride vapors with a caustic solution to neutralize residual traces of hydrogen chloride, and then scrubbing with a concentrated sulfuric acid stream to remove all traces of water vapor. The alkyl chloride is then compressed and liquefied.

The above process is highly efficient in that high conversions of alcohol and hydrogen chloride to the desired alkyl chloride are obtained, and that the operations for purification and recovery of the alkyl chloride are simple and straightforward. The process is limited in efficiency, however, particularly with respect to high production rates and also with certain feed stocks. The production rate of alkyl chloride is limited by carryover of foam from the reaction vessel to subsequent equipment. Such foams include an appreciable amount of the catalyst solution of a metal chloride such as ferric chloride or zinc chloride. Repeated instances of foaming or boilovers result in gradual deposition of solid catalyst in the reactor discharge lines, with resultant flow constriction and pressure build up. If the foaming tendencies were a precise constant, it would be possible to construct a sufficiently large reactor to insure that virtually no foam is entrained. However, it has been found that foaming tendency is highly variable, so that free space in a reactor provides no assurance of prevention of boilovers and the attendant cumulative difficulties.

The object of the present invention is to prevent the above described difficulties caused by variable and excessive foaming of catalyst solutions during operation. A further object is to provide a convenient and economical means whereby foams can be suppressed or collapsed. An additional object is to allow higher production rates in a given reaction space than heretofore possible.

My improved process accomplishes the above objects and also attains additional benefits. I have discovered that the foaming tendency of the above described alcohol-hydrogen chloride process, catalyzed by concentrated solutions of metal chlorides, can be controlled and virtually eliminated by carrying out the process in the presence of a minute quantity of sulfur dioxide. It has been found in addition, that the addition of a small amount of sulfur dioxide to the reaction space exerts a strong foam destroying action if foam formation has already started.

The specific details of the several embodiments of my process will, of course, vary, particularly in the quantity and manner of addition of the sulfur dioxide to the reaction space. In general, I prefer to feed a minute but foam suppressing quantity of sulfur dioxide to the reaction space continuously, or at least in foam suppressing quantities at sufficiently frequent intervals as to provide a uniform and continuing foam suppressing condition.

The benefits and manner of utilizing the improved process of my invention will be more easily understood from the following examples. The examples describe the manufacture of methyl chloride by the reaction of methanol, and hydrogen chloride, in the presence of a catalyst solution of zinc chloride.

*Example I*

Vaporized anhydrous methanol and hydrogen chloride gas were mixed in the weight ratio of 1.73 parts of hydrogen chloride to 1 part of methanol. The gaseous mixture was introduced at the bottom of a reaction vessel containing a supply of zinc chloride catalyst solution, the solution containing about 75 weight percent zinc chloride. In passage up through the catalyst solution over 99 percent of the methanol was converted to methyl chloride. The superficial velocity of the reacting gases was maintained at the very low level of less than one-half inch per second in order to minimize the entrainment owing to gas velocity. The catalyst solution and reacting materials were maintained at about 150° C. by means of the heat released by the reaction.

Formation of a copious amount of foam accompanied the reaction, the foam completely occupying the normally free vapor space above the catalyst liquid. The overhead product from the reaction vessel was passed to a disengaging vessel which provided sufficient residence time for the foam to coagulate as a liquid, a reflux line providing return to the reaction vessel. During an extended period of operation, the disengaging vessel and the reflux line were loaded to capacity.

The above example represents the type of difficulty that is very frequently encountered in processes involving the reaction of an alcohol and hydrogen chloride. Owing to lower temperatures normally encountered in reactor vapor discharge lines and in a disengaging vessel, there is a strong tendency of any liquid coagulated from foam to deposit catalyst solids, which cause an increase in pressure drop, and eventually pluggage of the reactor discharge. Reactor vessels for the alcohol hydrogen chloride reaction are preferably operated at a nominal pressure slightly above atmospheric. Pressure relief is provided by hydrostatic liquid seal legs under such conditions. Hence, on pressure build up and discharge through such pressure relief lines, the catalyst solution is discharged to waste and the valuable metal chloride content thereof is lost.

*Example II*

The procedure of Example I was repeated, except that sulfur dioxide gas was added concurrently, in proportions of one part by weight to 100 parts of hydrogen chloride, corresponding to a volume proportion of about 0.6 volume percent. The conversion of methanol to methyl chloride was again 99 percent or higher, but substantially no foaming in the reaction space occurred. After carrying out the process as above described for a period of four hours, the feeding of sulfur dioxide was discontinued, but the feed of hydrogen chloride and methanol was continued. This phase was continued for an additional 1.5 hours, during which very little foaming occurred. The sulfur dioxide does have a residual or continuing foam repressing quality, so that even extended interruptions to flow do not materially effect the beneficial results.

The precise amounts of sulfur dioxide to be employed will vary with the severity of the foaming tendency of the particular system. The foaming tendency is not fully predictable and may be caused by a number of different factors. For example, it is believed that various impurities or additives in the feed materials would have an effect on the surface tension of the liquid phase in the reaction vessel. Such impurities might be introduced either in the alcohol stream or the hydrogen chloride stream. In an ethyl alcohol feed, for example, various materials are normally present in the industrial grades as denaturants. In the case of hydrogen chloride, this feed is customarily derived from the reaction of salt and sulfuric acid, or by the direct burning of hydrogen and chlorine. In the latter case, and particularly when the hydrogen is derived from petroleum hydrocarbons, the main reaction normally is accompanied by production of small amounts of oxygenated or chlorinated hydrocarbon derivatives, owing to the presence of hydrocarbon impurities such as methane or ethane in the hydrogen stream. Such impurities are believed to be a major factor affecting foaming tendency in the subsequent hydrogen chloride-alcohol reaction.

Regardless of the cause of foaming, it has been found that sulfur dioxide can be successfully used to prevent or mitigate this difficulty. Although some times in extreme cases the required amount will exceed an amount equal to 0.01 mole per mole of the hydrogen chloride fed, such cases will be rare. It is preferred to operate with a sulfur dioxide feed rate in the range of from 0.001 to 0.01 mole per mole of hydrogen chloride fed.

As already indicated, my improved process is applicable in the manufacture of the various lower molecular weight alkyl chlorides, especially methyl chloride, ethyl chloride, propyl chloride, isopropyl chloride, butyl chloride, isobutyl chloride and tertiary butyl chloride. The most important applications of the process are in the manufacture of methyl chloride and ethyl chloride.

Although zinc chloride is the preferred catalyst for reaction of alcohols and hydrogen chloride, other metal chlorides are sometimes preferred. In particular, ferric chloride is an efficient and suitable catalyst. The improvement affected by my process is, of course, of value regardless of the specific metal chloride used as catalyst.

Having fully described my improved process and the preferred manner of operation thereof, what I desire to claim by Letters Patent is:

1. In the process of producing an alkyl chloride by the reaction of an alcohol and hydrogen chloride at elevated temperature in the presence of a concentrated solution of metal chloride catalyst, the improvement comprising introducing a foam suppressing quantity of sulphur dioxide into the reaction space in proportions of from 0.001 to 0.01 moles per mole of hydrogen chloride.

2. In the process of manufacturing ethyl chloride by reacting ethyl alcohol and hydrogen chloride in a reaction vessel and in the presence of a concentrated solution of zinc chloride catalyst, the improvement comprising feeding sulfur dioxide to the reaction vessel as a foam suppressor, the sulfur dioxide being fed in the proportion of from 0.001 to 0.01 moles per mole of hydrogen chloride fed.

3. In the process of manufacturing methyl chloride by the reaction of methyl alcohol and hydrogen chloride in a reaction vessel and in the presence of a concentrated solution of zinc chloride catalyst, the improvement comprising feeding sulfur dioxide to the reaction vessel as a foam suppressor, the sulfur dioxide being fed in the proportion of from 0.001 to 0.01 moles per mole of hydrogen chloride fed.

4. In a process for producing an alkyl chloride from an alcohol selected from the group consisting of methanol and ethanol, and hydrogen chloride derived from direct reaction of hydrogen from petroleum hydrocarbons and chlorine, by the reaction of the alcohol and hydrogen chloride in the presence of a concentrated solution of zinc chloride catalyst, the improvement comprising feeding sulfur dioxide to the reaction vessel as a foam suppressor, the sulfur dioxide being fed in the proportions of from 0.001 to 0.01 mole per mole of hydrogen chloride fed.

GEORGE W. MATTSON.

REFERENCES CITED

The following references are of record in the file of this patent:

UNITED STATES PATENTS

| Number | Name | Date |
|---|---|---|
| 1,824,951 | Frei | Sept. 29, 1931 |
| 2,404,800 | Hirschkind | July 30, 1946 |
| 2,497,150 | Carlson et al. | Feb. 14, 1950 |